Oct. 23, 1934.  W. D. ARCHEA  1,978,360
MILLING MACHINE
Filed Aug. 3, 1932  3 Sheets-Sheet 1

Inventor
WALTER D. ARCHEA
By AHK Parsons
Attorney

Oct. 23, 1934.  W. D. ARCHEA  1,978,360
MILLING MACHINE
Filed Aug. 3, 1932   3 Sheets-Sheet 2

Inventor
WALTER D. ARCHEA
By A. H. Parsons
Attorney

Oct. 23, 1934.    W. D. ARCHEA    1,978,360
MILLING MACHINE
Filed Aug. 3, 1932    3 Sheets-Sheet 3
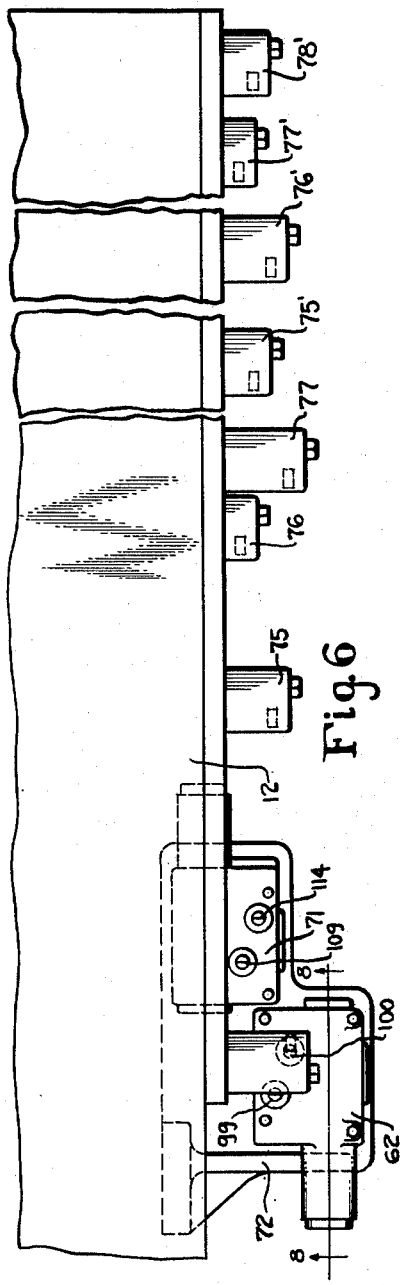
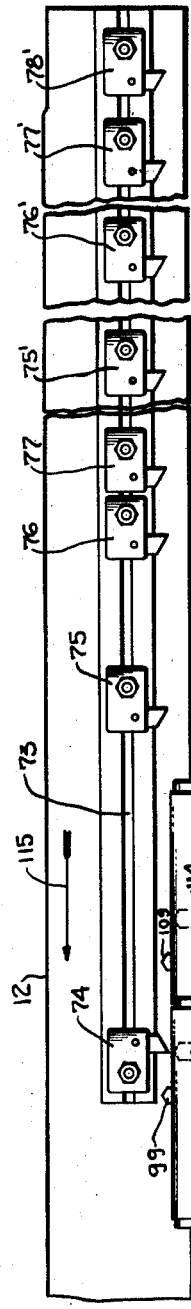
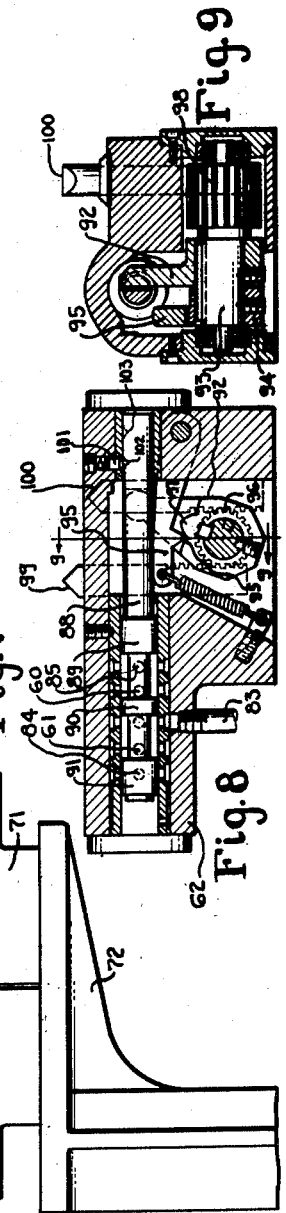
Inventor
WALTER D. ARCHEA
By AHKParsons
Attorney Patented Oct. 23, 1934

1,978,360

UNITED STATES PATENT OFFICE 1,978,360

MILLING MACHINE

Walter D. Archea, Cincinnati, Ohio, assignor to The Cincinnati Milling Machine Company, Cincinnati, Ohio, a corporation of Ohio Application August 3, 1932, Serial No. 627,336

19 Claims. (Cl. 90—19)

This invention relates to machine tool structures and more particularly to improvements in milling machines.

One of the objects of this invention is to provide improved mechanism for automatically milling successive surfaces that lie in other than a single plane.

Another object of this invention is to provide improved mechanism for effecting continuous relative movement between tool and work in other than a straight line.

A further object of this invention is to provide an improved milling machine for finishing surfaces that lie in different planes in one continuous operation and during a single pass between the tool and work.

An additional object of this invention is to provide improved mechanism for automatically variously positioning a tool relative to the work during relative movement therebetween whereby stepped surfaces may be machined in a continuous operation.

A still further object of this invention is to provide improved control mechanism for determining relative transverse shifting movements between tool and work during a constant feed movement therebetween.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 6 is a plan view showing the relation between the spindle control valves and the operating dogs therefor.

Figure 7 is a view in elevation of the parts shown in Figure 6.

Figure 8 is a section on the line 8—8 of Figure 6.

Figure 9 is a section on the line 9—9 of Figure 8.

Figure 1:
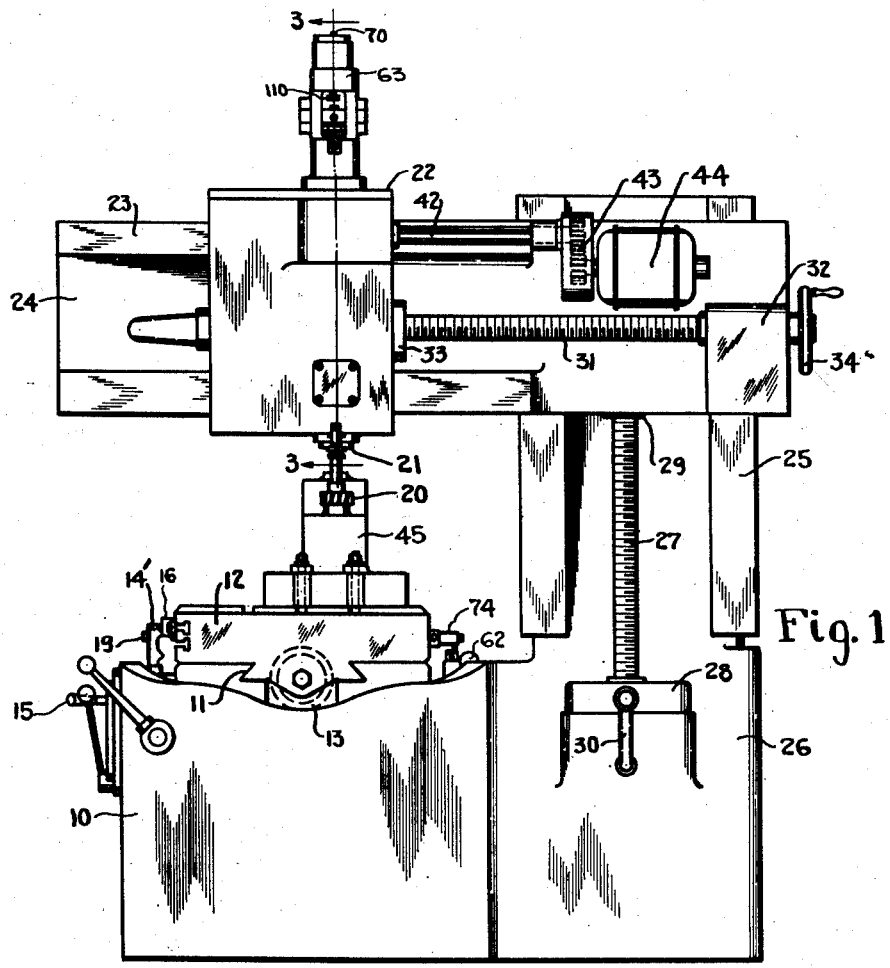
Figure 1 is an elevation of a machine embodying the principles of this invention.

Considerable difficulty and loss of time is experienced in machining work pieces having surfaces to be finished which do not lie in a single plane, and this invention therefore deals with a machine in which successive surfaces lying in different planes may be machined with the same facility now possible in machining surfaces that lie in one plane. Such a machine is illustrated in Figure 1 and comprises a bed or support 10 having guideways 11 formed thereon for receiving a work table 12.

This table may be reciprocated by any known type of transmission means which will impart the desired movements to the table dependent upon the type of production cycle utilized. Herein the machine is illustrated as set up for a one-way cycle and in such a case the table is moved at a feed rate in one direction, interspersed with rapid movements where time may be saved by utilizing the same, and at the completion of the work the table is automatically reversed and returned at a rapid rate to the starting position and stopped. This permits the operator to remove the finished work pieces and re-load the machine with unfinished work for the next cycle.

Transmission mechanisms for effecting this illustrative cycle are well known, the one used here being described more specifically in co-pending application of Nenninger and Ernst, Serial Number 220,721 filed September 15, 1927. The mechanism shown therein is of the hydraulic type and in accordance therewith the table 12 may be reciprocated by an hydraulic motor 13 comprising a piston and cylinder, the piston of which may be connected to the table by a piston rod 14. A selector valve may be provided which will control the admission of pressure to the cylinder, the selector valve being controlled by the plunger 14' which may be manually positioned by the lever 15 for set up purposes, and automatically controlled by suitable dogs 16, 17 and 18 for automatic control.

As more specifically described in the co-pending application, the dog 16 moves the plunger axially to stop the table upon its rapid return movement. After re-loading the machine the operator moves the directional control lever 15 to the position shown in Figure 2 causing the table to move toward the right at a rapid traverse rate. Upon approach of the cutter to the work, a second dog 17 moves the plunger axially in the opposite direction to change the rapid traverse rate to a feed rate. This feed rate may continue throughout the rest of the stroke or if desired, additional intermediate dogs may be applied to the table to effect intermediate rapid traverse movements between one finished surface and the next to economize on time if the intervening spaces are so large as to require it. At the completion of the milling operation the dog 18 engages the wing 19 on the trip plunger rotating the same in a counter-clockwise direction as viewed in plan, thereby changing the feed movement to a rapid return movement.

This cycle has been explained for the purpose of illustrating one method of effecting relative movement between the work and cutter, and it will be understood that other production cycles such as reciprocating cycles, may be utilized with equal effectiveness.

The cutter 20 is attached to the end of the spindle 21 which in turn is supported by a spindle carrier 22, the latter being laterally adjustable on guideways 23 formed on the cross rail 24. This cross rail is in turn mounted for vertical adjustment on guideways 25 formed on the face of the column 26 which is integrally attached to the bed 10. This vertical adjustment is effected by a feed screw 27 journaled against axial movement in the boss 28 formed on the column and engaging a suitable nut 29 fixed in the cross rail. Rotation of the screw may be effected by suitable mechanism through rotation of the manual control lever 30. From this it will be seen that means have been provided for effecting a rough or approximate adjustment between the cutter and the surface of the work.

Similarly, a rough or approximate adjustment of the cutter laterally of the work table may be obtained by rotation of the adjusting screw 31 fixedly journaled at one end in a boss 32 integral with the rail 23. The free end of the screw may be passed through a suitable nut 33 fixed with the carrier 22 so that upon rotation of the screw 31 by the hand wheel 34, the cutter may be adjusted laterally of the work table 12.

Figures 3, 5:
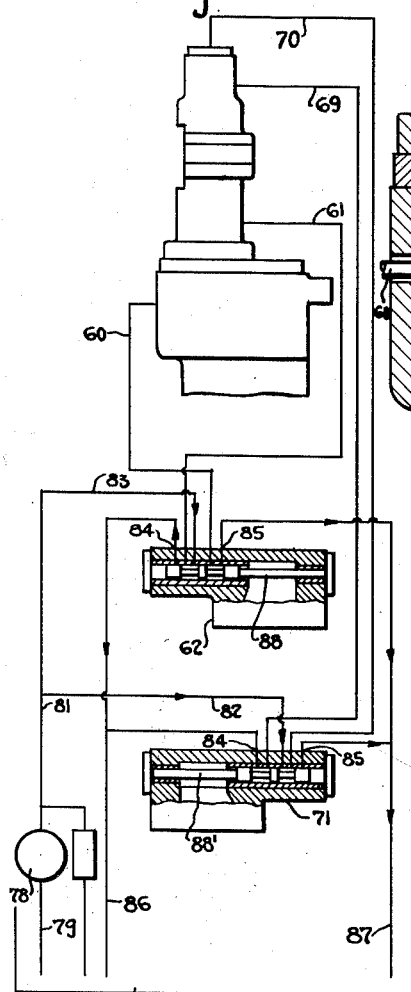
Figure 3 is a section on the line 3—3 of Figure 1.
Figure 5 is a diagrammatic view of the hydraulic control circuit for the spindle positioning means.

As more particularly shown in Figure 3 the spindle 21 is journaled in anti-friction bearings indicated generally by numerals 35 and 36 which are fixed in an axially adjustable quill 37. The rear end of the spindle extends through the hub 38 of bevel gear 39, the hub being journaled in anti-friction bearings 40 fixed with the carrier 22. Additionally, the spindle has a splined connection in the hub 38 whereby it may be axially adjusted upon movement of the quill without disturbing the drive connection. The drive gear 39 of the spindle is rotated by bevel gear 41 fixed against axial movement in the carrier 22 but having a splined connection with the drive shaft 42 whereby relative movement may occur between the parts. This drive shaft is connected by suitable gearing 43 to a prime mover, such as an electric motor 44, carried by the rail 24.

From the foregoing it should now be seen that a milling machine has been provided having a work table which may be reciprocated automatically through a production cycle and which has associated therewith a cutter which is manually adjustable in two directions with respect to the work carried thereby.

By means of mechanism to be presently described, the cutter 20 may be automatically positioned in various horizontal planes above the surface of the table 12 for finishing spaced surfaces on work carried thereby. A typical example of the manner in which this may be done is diagrammatically illustrated in Figure 2, where the cutter 20 is shown in full lines to represent the starting position. In this example two similar work pieces 45 are attached to the table, and each have bosses 46 and 47 lying in spaced relation which are to be finished in a single pass between work and cutter. As the table feeds in the direction of the arrow 48 the cutter 20 will pass over the boss 46 to finish the same, after which it will move to its extreme upward position 49 during continuous feed of the table resulting in a relative movement between the parts in a diagonal path represented by the line 50. At the proper time the cutter will then move downward to the intermediate position 51 to engage and finish the boss 47. Having finished this surface the cutter will move upward again to its extreme position during which a rapid traverse movement of the table may take place if so desired. At the proper time the cutter will move downward again to the position 52 and then repeat the foregoing cycle on the second piece of work. Upon completion of the last piece of work the cutter will be at the point 53 and will remain in that position during the rapid return movement of the table which will then position the cutter with respect to the work at the point 54, at which time suitable control mechanism will become effective to move the cutter downward to its starting position.

Mechanism for effecting this illustrative cycle will now be described. The quill 37, Figure 3, is secured to the end of a reciprocable plunger or piston rod 55 having integrally formed thereon a piston 56 which is slidably mounted in a cylinder 57. Ports 58 and 59 are formed at opposite ends of this cylinder and connected by channels 60 and 61 to a control valve 62, Figure 5.

A housing 63 is attached to the upper end of the cylinder 57 and has formed therein an additional cylinder 64 having a contained piston 65 which operates a piston rod 66 extending through the lower end of the cylinder to engage the upper end of the piston 55. This cylinder has ports 67 and 68 which are connected respectively by channels 69 and 70 to a second control valve 71. As shown in Figures 6 and 7 these valves may be mounted on a bracket 72 adjacent to the side of the work carrying table which may be provided with the usual T-slot 73 for carrying a plurality of operating dogs 74, 75, 76 and 77.

Fluid pressure may be supplied to these valves by means of an auxiliary pump 78 shown diagrammatically in Figure 5, having an intake pipe 79 for withdrawing fluid from a reservoir 80 and delivering it under pressure to channel 81 which divides into branch supply lines 82 and 83. Each valve is provided with a pair of exhaust ports 84 and 85 which are connected to the return channels 86 and 87. Each valve has a plunger such as 88, Figure 8, having spools 89, 90 and 91 formed thereon, whereby upon movement to one position the pressure line such as 83 is connected to one cylinder channel while the other cylinder channel is simultaneously connected to reservoir. The plungers 88 and 88' are operatively connected to individual trip mechanisms by means of a crank arm 92 having lost motion connection with the plunger 88. The crank 92 is keyed to a shaft 93 which has secured thereto the sleeve member 94 adapted to be engaged by the spring pressed detent 95. The member 94 has a pair of indents 95 and 96 separated by a peak 97, the mechanism operating in such a manner that movement of the member a sufficient distance to cause the detent to ride over the peak will automatically effect a completion of the movement. A gear 98 is keyed to shaft 93 and operatively engages a pair of rack plungers 99 and 100.

To further assist in properly positioning the valve plunger a spring pressed detent 101 is provided for engaging properly spaced notches 102, 103, formed on the plunger. The dogs are positioned to effect relative movement between the spindle and cutter along the path shown in Figure 2. Upon return movement of the work table 12 in a direction opposite to arrow 115, Figure 7, the dog 74 will engage the plunger 100 moving the same downward to the position shown in Figure 7 and moving the valve plunger 88 to the right. This will connect the pressure line 83 with channel 61 which will admit pressure to the upper end of cylinder 57 forcing the piston 56 and cutter spindle 21 downward to a predetermined position. This position is determined by means of an adjustable stop member 104 which is threaded in a bushing 105 and provided at the lower end with a micrometer dial 106 cooperating with a fixed pointer 107. A lock nut 108 may be utilized to prevent movement of the stop member after it has been set in the desired position. This will correspond to the full line position of cutter 20 in Figure 2 at which time the trip control mechanism for the table will stop its movement to permit reloading thereof.

When the operator starts the table in its next cycle the dog 74 will pass over plunger 100 without disturbing it.

Thus the spindle and cutter will remain in this position until the second dog 75 engages plunger 99, depression of which will now disconnect the pressure from the upper end of the cylinder and connect it to the lower end causing the spindle to be withdrawn. During these movements of the spindle the plunger 88' of valve 71 has been in such a position, that the pressure line 82 is connected to the lower end of cylinder 64 thereby maintaining the plunger 66 thereof in an upward position. As the piston rod 55 is elevated by the admittance of pressure to port 58, the upper end thereof will engage the lower end of the piston rod 66 and thereby limit its upward movement. This withdraws the cutter spindle to its highest position thereby permitting it to clear any intervening obstructions on the work between the first finished surface and the subsequent surface to be finished. When the next surface, which is at a different level from the first one, moves to a position in line with the cutter, the third dog 76 engages the trip plunger 109 shifting the valve plunger 88' of valve 71 to effect the admittance of pressure to the upper end of cylinder 64. The cutter spindle will now move downward until a flange 110 formed on the lower end of piston 66 engages the upper end of a second adjustable stop member 111. This adjustable stop member is threaded at 112 in a fixed part of the housing 63 and is also provided with graduations 113 to determine the position thereof. It will be recalled that pressure was admitted to the lower end of cylinder 57 to elevate the spindle and this elevating pressure will still be present when the pressure is admitted to the upper end of cylinder 64. But as will be seen from the drawings, the piston 65 is larger in diameter than the piston 56 and therefore the total pressure on the upper end thereof will be greater than the total elevating pressure on the piston 56 and thus the spindle will move down and be maintained in the position as determined by the stop member 111.

Upon the completion of the first work piece, the dog 77 will engage the trip plunger 114 of valve 71 thereby shifting the plunger thereof to connect the lower end of cylinder 65 with pressure thereby permitting the pressure acting on the lower end of piston 56 to cause upward movement of the spindle in its extreme upper position. If the character of the work is such that successive pieces are milled during one reciprocation of the table as in the present illustration, an additional set of dogs such as 74', 75', 76' and 77' may be suitably positioned on the side of the table for controlling the movement of the cutter with respect to the second work piece. In any case after the last work piece has been finished it will be noted that the cutter spindle is returned to its extreme upper position thereby insuring against interference with any projections on the work during the rapid return movement of the table to its starting position.

All of the trip dogs with the exception of 74 are latch dogs of a well-known type which are pivotally mounted for movement in one direction from the vertical so that during return movement of the table, the dogs will be ineffective passing over the various plungers without operating them. The trip dog 74 is pivotally mounted for movement in a direction opposite to the remaining trip dogs whereby it will be operative only on the return stroke of the table.

Figure 2:
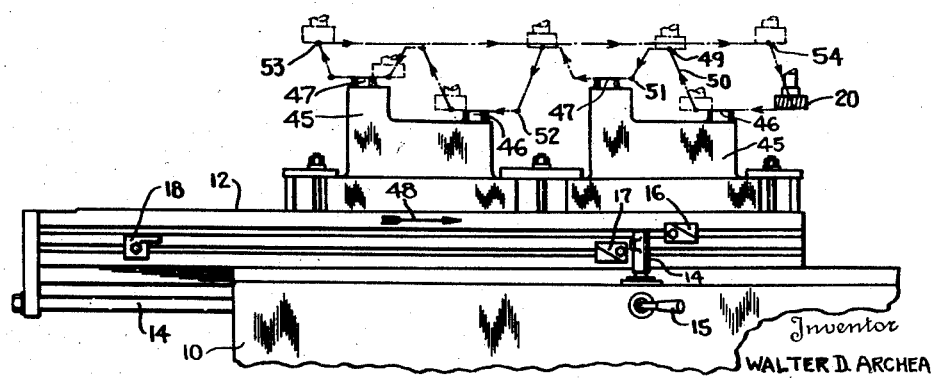
Figure 2 is a semi-diagrammatic view illustrating one relative path of movement between tool and work made possible by this invention.
Figure 4:
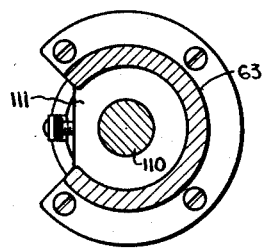
Figure 4 is a detail section on the line 4—4 of Figure 3.

The mechanism in Figure 2 is shown as directly connected to the quill for effecting movement thereof toward and from the table, but it will be apparent that it may be mounted on the rail and directly connected to the carrier in those cases where the plane of operation shown in Figure 2 lies parallel to the surface of the table instead of perpendicular thereto.

From the foregoing it should now be evident that an improved machine has been provided for milling in a single operation a plurality of surfaces which do not all lie in a given path of relative movement between cutter and work but which will require a relative lateral shifting between the cutter and work with respect to said path of travel in order to encompass them in a single stroke of the table.

What is claimed is:

1. A milling machine having a support, a work table mounted on the support, power actuated means for effecting translation of the table, a cutter spindle journaled on the support, hydraulically actuated means for effecting movement of the spindle toward and from the work table, a control valve therefor, means to position the control valve to cause movement of the spindle to a first predetermined position with respect to the work table, additional means to position the control valve in timed relation with the translation of the table to position the cutter spindle in a second predetermined relation to the work table, and a final means operative on the control valve in timed relation to the table movement to position the cutter spindle in a third predetermined relation to the table.

2. A milling machine having a reciprocating table adapted to receive a work piece having spaced parallel surfaces, a rotating milling cutter for finishing said surfaces, a pair of hydraulic cylinders, pistons reciprocably mounted in said cylinders, a piston rod operatively connecting one of said pistons to the cutter for effecting relative adjustment thereof with respect to the work, means to admit pressure to the end of one cylinder to position the cutter in the plane of one of said surfaces to finish the same during relative movement of the work, means to reverse the connections to said cylinder to effect withdrawal of the cutter, and additional means to admit pressure to the second cylinder to position the cutter in the plane of the second surface on the work to finish the same during relative feed movement thereof.

3. A milling machine having a support, a work table reciprocably mounted on the support, a cutter spindle journaled in the support for movement toward and from the work table, hydraulically actuated means for successively positioning the cutter in spaced planes parallel to the work support including co-axial cylinders, individual pistons mounted in said cylinders, said pistons having differential areas, means to admit pressure in one cylinder to position the cutter in a predetermined plane, means to admit pressure simultaneously to both cylinders to effect relative approach of said pistons whereby the resultant movement will be determined by the piston of larger area, and means to limit the movement of the larger piston to position the cutter in a second plane parallel to the first named plane.

4. A milling machine having a work support, a rotatable cutter for milling a plurality of surfaces on work carried by the support, hydraulically actuated means for moving the cutter to a first position, additional hydraulically actuated means for moving the cutter to a second position, a positive stop for determining each position and micrometer adjusting means for setting each positive stop.

5. A milling machine having a work support, a rotatable cutter for milling a plurality of surfaces on work carried by the support, hydraulically actuated means for moving the cutter to a first position, additional hydraulically actuated means for moving the cutter to a second position, a positive stop for determining each position, micrometer adjusting means for setting each positive stop, and means for moving said cutter to a third position out of contact with the work.

6. A milling machine having a reciprocable work table, power operated means for reciprocating said table, a cutter support, a rotatable cutter journaled in said support, hydraulically actuated means for moving the cutter into a first cutting plane, a control valve for said hydraulically actuated means, additional hydraulically actuated means for moving the cutter to a second cutting plane, a second control valve, and trip dogs carried by the table for positioning said control valves in predetermined succession to effect cutting in said planes in timed relation with the movement of the work and during continuity of table movement.

7. In a milling machine having a work table, the combination of a spindle carrier, said spindle carrier having an axially adjustable quill, a cutter spindle journaled in said quill for movement therewith, a piston rod operatively connected to the quill, an hydraulic cylinder, a piston secured to the piston rod and movable in said cylinder, a source of pressure, valve means for admitting pressure to opposite ends of said cylinder to effect movement of the spindle toward and from the work support, a stop for determining the approaching movement of the cutter toward the work, and micrometer means for accurately positioning said stop.

8. In a milling machine having a work table, the combination of a spindle carrier, said spindle carrier having an axially adjustable quill, a cutter spindle journaled in said quill for movement therewith, a piston rod operatively connected to the quill, an hydraulic cylinder containing a piston secured to the piston rod, a source of pressure, valve means for admitting pressure to opposite ends of said cylinder to effect movement of the spindle toward and from the work support, a stop for determining the approach movement of the cutter relative to the work, micrometer means for accurately positioning said stop, and additional means effective on the free end of said piston rod for positioning the quill intermediate said first named positions.

9. In a milling machine having a work table, the combination of a spindle carrier, said spindle carrier having an axially adjustable quill, a cutter spindle journaled in said quill for movement therewith, a piston rod operatively connected to the quill, an hydraulic cylinder containing a piston secured to the piston rod, a source of pressure, valve means for admitting pressure to opposite ends of said cylinder to effect movement of the spindle toward and from the work support, a stop for determining the movement of the cutter in one direction, micrometer means for accurately positioning said stop, additional means effective on the free end of said piston rod for positioning the quill intermediate the said first named positions, said means including an hydraulically actuated piston, and adjustable stop means for limiting the movement of said last named piston in one direction.

10. A milling machine having a work support, a rotatable cutter, power operated means for effecting relative movement between the work and cutter in one path, hydraulic control mechanism for determining the relative position of the cutter with respect to the work support along a second path, said mechanism comprising a first cylinder, a control valve therefor, a pair of channels coupling the first cylinder to its control valve, a second cylinder, a second control valve therefor, a pair of channels connecting opposite ends of the second cylinder to its control valve, a fluid pump, branch pressure lines extending from the pump to said control valves, and trip operated control mechanism for positioning said control valves in timed relation with the relative movement between cutter and work along the first named path to effect various positionings of the cutter along the second named path and during continuity of work movement in the first path.

11. A milling machine comprising a bed, a work table reciprocably mounted on the bed, a column, a rail adjustably mounted on the column, a spindle carrier reciprocably mounted on the rail, said spindle carrier having an adjustable quill movable relative to the table to position a cutter variably relative thereto, a prime mover carried by the rail, transmission mechanism coupling the prime mover with the spindle for operation thereby, means to adjust the rail on the column to effect a major adjustment of the cutter relative to the work table, a positive stop, micrometer adjusting means for minutely positioning said stop, means to adjust the carrier on the rail to determine lateral positioning of the cutter relative to the table, hydraulically actuated means for moving the quill relative to the table, and dog operated control means for effecting said movement in timed relation with the movement of the table.

12. A milling machine having a table, a rotatable cutter, power actuated means for effecting relative movement between the parts in a first predetermined path, hydraulically actuated means for effecting relative adjustment between the cutter and work support in a path normal to the first named path including an hydraulically reciprocable piston member, a plunger operatively connected to the cutter, means to maintain the plunger in contact with one end of said piston member for movement in opposite directions therewith, and means to apply pressure to said plunger to effect movement thereof independent of said piston member to move the cutter thereby to an additional position.

13. A control mechanism for moving a part to a plurality of different positions, comprising a piston operatively connected to said part, a cylinder containing said piston, a source of pressure, a control valve coupled to said source and having channel connections to opposite ends of said cylinder, said valve having a first position to couple one end of the cylinder to pressure and thereby move the part to a first position, means to adjust the valve to a second position to couple pressure to the opposite end of the cylinder and thereby move the part to a second position, an additional piston mounted co-axially with the first named piston and having a cylinder surrounding the same, a second control valve coupled to the source of pressure in parallel with the first named control valve and having channel connections to opposite ends of the second named cylinder, said second valve being positionable to couple pressure to one end of its connected cylinder to effect movement of the first named piston and thereby adjust the part to a third position.

14. A milling machine having a support, a work table mounted on the support, a rotatable cutter spindle carried by the support, power actuable means for effecting translation of one of said parts, hydraulically actuated means for effecting relative movement between the spindle and work table toward and from one another, a control valve for determining the coupling of pressure to said hydraulic means, said valve being positionable to cause relative movement between the spindle and work table to a first predetermined relative position, additional means to position the control valve in timed relation to the relative translation between the parts to reposition the spindle and table relative to one another into a second predetermined relation, and a final means operative on the control valve in timed relation to said translation to reposition the table and spindle into a third predetermined relation.

15. In a milling machine having a rotatable tool spindle and a work support movable transversely of the spindle, the combination of means for variably positioning the spindle with respect to the work support, including a first stop, a fluid operable member connected with the spindle and movable against said stop for positioning the cutter in one plane, a second stop, a second fluid operable member for selectively moving the second stop between two positions to thereby enable additional positions of the cutter, and separate trip controlled means operable by the table for determining operation of each of said members.

16. In a milling machine having a tool spindle and a work support movable transversely thereof, the combination of means for variably positioning the spindle toward and from the work support including a first stop for limiting movement of the spindle in one direction, micrometer means for determining the position of said stop, a fluid operable actuator connected with the spindle and engageable with said stop, a second stop for limiting the movement of said actuator in a second direction, micrometer means for determining the adjustment of said second stop, and fluid operable means for positioning the second stop in either one of two positions.

17. In a milling machine having a support, a spindle carrier having a tool spindle journaled therein carried by the support, and a work table mounted for reciprocation transversely to the axis of the spindle, the combination of means for variably positioning the spindle relative to the work support including a first fluid operable member for moving the spindle to an advanced position, additional fluid operable means for moving the spindle selectively to a plurality of retracted positions, and means for adjusting the spindle carrier transversely of the work support without disturbing the spaced relationship of the tool spindle with respect to the work support.

18. In a milling machine having a rotatable cutter spindle and a work support movable transversely thereof, the combination of means for variably positioning the cutter spindle toward and from the work support including a pair of coaxial cylinders having contained pistons and piston rods, means coupling the spindle with one of said piston rods for movement therewith, reversing valves for the respective cylinders, individual trip control mechanisms for each valve, said valves having a first position to cause movement of the spindle and connected piston rod to one position, a second position to cause movement of both pistons in the same direction and thereby a second position of the spindle, and to a third position to cause said pistons to move in opposition to one another to move the spindle to a third position.

19. In a milling machine having a rotatable cutter spindle and a work support movable transversely thereof, the combination of means for variably positioning the cutter spindle toward and from the work support including a pair of coaxial cylinders having contained pistons and piston rods, means coupling the spindle with one of said piston rods for movement therewith, reversing valves for the respective cylinders, individual trip control mechanisms for each valve, said valves having a first position to cause movement of the spindle and connected piston rod to one position, a second position to cause movement of both pistons in the same direction and thereby a second position of the spindle, and to a third position to cause said pistons to move in opposition to one another to move the spindle to a third position, and means automatically controlled by the table for determining the various positions of said reversing valve.

WALTER D. ARCHEA.